United States Patent [19]

Grindatto et al.

[11] Patent Number: 5,427,761
[45] Date of Patent: Jun. 27, 1995

[54] PROCESS FOR THE PRODUCTION OF METAL CARBIDES HAVING A LARGE SPECIFIC SURFACE UNDER ATMOSPHERIC PRESSURE INERT GAS SCAVENGING

[75] Inventors: Bernard Grindatto, Pont en Royans; Alex Jourdan, Voiron; Marie Prin, Moirans, all of France

[73] Assignee: Pechiney Recherche, Courbevoie, France

[21] Appl. No.: 978,954

[22] Filed: Nov. 19, 1992

[30] Foreign Application Priority Data

Nov. 21, 1991 [FR] France ................................ 91 14606

[51] Int. Cl.⁶ .............................................. C01B 31/34
[52] U.S. Cl. ..................... 423/440; 423/345; 423/346; 423/439; 423/444; 502/174; 501/87
[58] Field of Search ............... 423/345, 346, 440, 439, 423/444; 502/174; 501/87

[56] References Cited

U.S. PATENT DOCUMENTS 4,529,575 7/1985 Enomoto et al. .
4,851,262 7/1989 McFeaters ........................... 423/440

FOREIGN PATENT DOCUMENTS 286294 10/1988 European Pat. Off. .
313480 4/1989 European Pat. Off. .
396475 11/1990 European Pat. Off. .
90/11251 10/1990 WIPO .

OTHER PUBLICATIONS

Journal of the American Ceramic Society, 66:7, pp. C111–C113, Jul. 1983.
Japanese Patent Abstract–JP 57-101100–vol. 26, No. 186—(Sep. 1982).
Japanese Patent Abstract–JP 59-227706–vol. 9, No. 096—(Apr. 1985).
Japanese Patent Abstract–JP 61-074635–vol. 10, No. 245—(Aug. 1986).
Japanese Patent Abstract–JP 1-270507–vol. 14, No. 34—(Jan. 1990).

Primary Examiner—Asok Pal
Assistant Examiner—E. D. Irzinski
Attorney, Agent, or Firm—Dennison, Meserole, Pollack & Scheiner

[57] ABSTRACT

A process for the production of a metal carbide having a BET specific surface area of 10 to 200 m²/g, in which a reaction mixture including carbon having a specific surface area of at least 200 m²/g and a compound of the metal to be reacted with the carbon which is volatile at 900° C. to 1400° C. is introduced into a reactor, the reactor is scavenged by a flow of inert gas and the reaction mixture is heated under the flow of inert gas at 900° to 1400° C. for a time sufficient to volatilize the metal, reduce the volatilized metal compound to the metal with and carburize the metal by reaction with carbon, forming the metal carbide. The metal carbide formed is cooled under the flow of inert gas.

20 Claims, 2 Drawing Sheets

PROCESS FOR THE PRODUCTION OF METAL CARBIDES HAVING A LARGE SPECIFIC SURFACE UNDER ATMOSPHERIC PRESSURE INERT GAS SCAVENGING

FIELD OF THE INVENTION

The invention relates to the technical field of heavy metal carbides having a large specific surface to be used as catalysts or catalyst supports in the chemical or petrochemical industries or for silencers.

DESCRIPTION OF RELATED ART

French patent applications 2 621 904 and 2 645 143 describe a process for the preparation of silicon carbides end heavy metal carbides having a large specific surface consisting of reacting in vacuo a compound of silicon or the heavy metal at a temperature such that the compound is gaseous, on carbon having a large specific surface, e.g. active carbon or charcoal. The carbide obtained retains the memory of the specific surface of the starting carbon and has a specific surface much larger than that of the prior art metal carbides, although smaller than that of the starting carbon.

The problem set by the inventors was to improve the process for the production of these carbides on the one hand through obviating the use of vacuum and on the other by making the process continuous, the aim of these improvements being to increase productivity and reduce costs.

The aforementioned French patent application 2 645 143 describes the principle of preparing metal carbides with a large specific surface, together with performance examples. The carbon having a large specific surface, e.g. active carbon, is mixed with a compound, which is volatile at the reaction temperature, of the metal, whereof it is wished to obtain the carbide. The mixture placed in a crucible is heated to a temperature between 900° and 1400° C. under a vacuum below 13 hPa and for a period between 1 and 7 hours, but usually at least four hours.

As a variant, it is also possible to produce the volatile compound of the metal in a first area and carry out the reduction and carburization in a second area, the temperatures of the two areas being possibly different. In the part icular case of the preparation of silicon carbide described in French patent application 2 621 904, the volatile compound of the silicon is SiO produced by the reduction of silica by silicon.

European patent application 272 377 (VEREINIGTE ALUMINIUM WERKE) describes the continuous production of carbides or nitrides of boron, aluminium, silicon as well as carbides, nitrides or borides of metals of groups IV, V and VI (Ti, Zr, V, Nb, Ta, Cr, Mo, W) by the carboreduction of oxides in graphite cruibles circulating in a vertical furnace. A group of successive crucibles vertically traverses the furnace from bottom to top. The crucibles are heated by the Joule effect with the aid of an electric current traversing through the group of crucibles and supplied by a granular carbon bed surrounding said crucibles and flowing from top to bottom. A circulation of neutral gas or nitrogen can take place within the charge contained within the crucibles. The temperature indicated in the description varies, as a function of the products, from 1500° to 3000° C. and in the examples from 1700° to 3300° C.

U.S. Pat. No. 4,008,090 (MIYAKE) describes the production of W carbide mixed or not with carbides of Ti, Ta, NB using the following stages:

Mixing the W oxide to which may or may not have been added oxides of Ti, Ta or Nb with carbon powder in an adequate quantity to reach the theoretical combined carbon quantity and form pellets therefrom, heating said pellets in a rotary furnace at 1000° to 1600° C. in an atmosphere of nitrogen or argon in order to reduce the oxygen content to <5%, heating said pellets in a rotary furnace at 1400° to 2000° C. in a hydrogen atmosphere.

U.S. Pat. No. 4,529,575 (RYO ENCMOTO et al) describes a continuous ultrafine silicon carbide production process consisting of preparing a mixture of silica powder and carbon powder with a surface of 1 to 1000 $m^2/g$ and an organic binder in order to produce granules therefrom and then charging said granules into the top of a continuous reactor in which they successively traverse by gravity a preheating area, a heating area (1500° to 2000° C.), where the SiC forms and a cooling area under a non-oxidizing atmosphere and at the outlet from which the SiC is discharged.

The article in "Journal of the American Cetamic Society⇌, Vol. 66, No. 7, July 1983, entitled "Beta" SiC powders produced by carbothermic reduction of sillica in a high temperature rotary furnace" by George Chia-Tsing WEI describes the production of silicon carbide by $SiO_2$ reduction using carbon in a rotary furnace and under argon scavenging.

However, none of these documents describes the combination of the means defined hereinafter permitting the production of carbides having a large specific surface from carbon having a large specific surface and a volatile metal compound using a process under atmospheric pressure inert gas scavenging.

SUMMARY OF THE INVENTION

Principle

The use of vacuum in French patent application 2 645 143 is justified for the following reason. The reduction and then carburization of the metal oxides takes place accompanied by the release of carbon monoxide. For example, with molybdenum trioxide $MoO_3$, the following successive reactions occur:

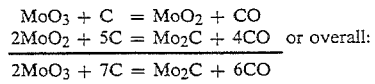

$$MoO_3 + C = MoO_2 + CO$$
$$2MoO_2 + 5C = Mo_2C + 4CO \quad \text{or overall:}$$
$$2MoO_3 + 7C = Mo_2C + 6CO$$

For each mole of $Mo_2C$ produced, it is necessary to eliminate 6 moles of CO, i.e. approximately 135 liters of CO for 203 g of $Mo_2C$ produced.

The function of the vacuum is to eliminate the CO as it is formed, which displaces the equilibrium of the above reactions towards the formation of carbide.

Although vacuum is widely used in the industry, it is a difficult and costly procedure. It also makes it more difficult to pass from a discontinuous to a continuous process.

The present invention, which aims at obviating the use of vacuum, results from the combination of the following stages:

contacting in a reactor a reactive mixture constituted on the one hand by carbon, whose specific surface is at least equal to 200 $m^2/g$, and on the other hand a compound, volatile under the conditions of the reaction, of the metal whereof the carbide is to be produced, in proportions close to stoichiometry; scavenging said reactive mixture by an inert gas flow; still under inret gas scavenging, heating the reactive mixture to a temperature between 900° and 1400° C. for a time adequate to reduce volatile metal compound by carbon and finally carburize the reduced product; cooling the carbide obtained, still in the presence of inert gas, to a temperature such that it no longer oxidizes in contact with air; extracting the carbide from the reactor.

This discontinuous process can be made continuous by the following variant: introducing into a continuous reactor a reactive mixture constituted on the one hand by carbon, whose specific surface is at least equal to 200 m²/g, and on the other hand a compound, volatile under the conditions of the reaction, of the metal whereof the carbide is produced, in proportions close to stoichiometry; scavenging by the reactor by an inert gas flow introduced from the side of the entrance of the reactive mixture and extracted from the side of the exit of the carbon obtained; passing the reactive mixture into a first area heated to a temperature between 900° and 1400° C. for a time adequate to volatilize the metal compound, reduce it and finally carburize it in contact with the carbon; passing the reactive mixture into a second area where the carbide obtained, still in the presence of inert gas, is cooled to a temperature such that it no longer oxidizes in contact with air; extracting the carbide from the reactor.

Reactive mixture

The reactive mixture is constituted by carbon and a compound, volatile at the reaction temperature, of the metal whereof it is wished to prepare the carbide.

The carbon must have a large specific surface, exceeding 200 m/g, measured by the BET method. The active carbon or charcoal, whose specific surface can reach 2000 m²/g constitutes the preferred material, but all carbon variants which have undergone an activation treatment to increase their surface are all suitable.

The efficiency of the carbon, no matter whether it is formed by charcoal or activated carbon can be increased by two treatments preceding its reaction with the volatile metal compound: by impregnation in a solution of salts of Ce, U, Ti, Zr, Hf, lanthanides, drying and thermal decomposition, as indicated in French application 2 645 143, by a vacuum degassing treatment, whose interest will be explained hereinafter, at temperatures between 1000° and 1200° C. for between 0.5and 2 hours.

Finally, the carbon can be in pulverulent or agglomerated form, granules or pellets obtained in accordance with any known process.

The metals from which it is wished to obtain the carbide by the process according to the invention are in particular silicon, transition metals (groups 3b, 4b, 5b, 7b, 8 of series, 4, 5, 6 of the classification of elements), metals of rare earths and actinides.

They must also have at least one compound which is volatile under the reaction temperature conditions. Among these compounds, preference is given to oxides or iodides, but other compounds may also be suitable such as chlorides, fluorides or sublimatable organometallic compounds. Among the metals having these characteristics and whose carbides have a catalytic interest, reference can be made to Mo, W, Re, V, Nb, Ta, Ti, Cr, Ni.

As the carbon, the metal compound can be in the form of a more or less fine powder, or in agglomerated form, e.g. pellets or granules. It is also possible to mix the carbon and the metal compound in the form of a powder and form agglomerates therefrom.

In the case of silicon, if the suboxide SiO is used as the volatile compound, said unstable suboxide must be prepared in the actual reactor at the time of its reaction with the carbon. However, in order to avoid parasitic reactions, it is important that the reduction of the silica by silicon takes place outside the presence of carbon and outside the direct scavenging by the inert gas, said scavenging more particularly serving to eliminate the CO produced in the carburization reaction.

Reaction conditions

The Applicant has discovered that the CO content on leaving the reactor forms a means for controlling its operation in order to ensure an optimum, constant efficiency and a good quality of the products. The reduction and carburization reactions produce CO, which is entrained by the inert gas, which favours the evolution of the reaction towards the formation of the carbide. The inventors have discovered the important part played by the CO partial pressure in the inert gas. If this pressure becomes too high it has two harmful effects. As a function of the temperature, it can locally give rise to a retrogression of the carburization reaction, the CO reacting on the carbide formed in order to give once again the oxide and the carbon, which correspondingly decreases the reactor efficiency.

For example, the silicon carbide formation reaction is as follows:

$$SiO + 2C = SiC + CO \qquad (1)$$

This reaction represents an equilibrium between the four constituents present, whereof three are independent. Therefore the system is bivariant. However, the pressure of SiO, $P_{SiO}$ is fixed by the $SiO_2 + Si = 2SiO$ reaction and is only dependent on the temperature. The system then becomes monovariant and the $P_{CO}$ partial pressure is also solely a function of the temperature.

The following table 1 indicates said CO partial pressure as a function of the temperature.

TABLE 1

| Temperature (°C.) | $P_{CO}$ (hPa) |
|---|---|
| 1230 | 266 |
| 1250 | 376 |
| 1280 | 526 |

Thus, if at a temperature of e.g. 1250° C., the CO partial pressure exceeds 376 hPa, reaction (1) will take place in the sense:

$$SiC + CO = Si + 2C$$

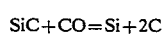

the SiO formed then reacting according to:

$$SiO + CO = SiO_2 + C \qquad (2)$$

As a further harmful effect it can give rise to the oxidation of the volatile oxide in order to form a less volatile oxide, whilst producing carbon fines. This is more particularly the case with silicon oxide SiO, which reacts on the CO in order to once again give silica and carbon according to reaction (2). This carbon deposit on the SiO source (mixture of Si and SiO₂) pollutes said mixture and gives rise to carbide, which clearly does not have the characteristics and in particular specific surface of that obtained by "filiation" from the solid carbide introduced as the starting substance.

Reaction (2) represents an equilibrium between the four constituents present, whereof three are independent. Therefore the system is bivariant. However, as stated hereinbefore, the pressure of SiO, $P_{SiO}$ is fixed by the reaction $SiO_2+Si=2SiO$ and is only dependent on the temperature. The system then becomes monovariant and the partial pressure $P_{CO}$ is also solely a function of the temperature. The following table 2 indicates said CO partial pressure as a function of the temperature.

TABLE 2

| Temperature (°C.) | $P_{CO}$ (hPa) |
|---|---|
| 1230 | 1.8 |
| 1250 | 2.7 |
| 1280 | 4.2 |

Thus, if at a temperature of e.g. 1250° C., the CO partial pressure exceeds 2.7 hPa, the reaction (2) will take place in the sense:

$$SiO+CO=SiO_2+2C$$

Therefore it is vital to check the CO content on leaving the reactor in order to ensure an optimum, constant efficiency and a good quality of the products and in particular a very low oxide quantity which has not reacted.

This discovery has led the inventors to introduce into their operating procedure two supplementary means, namely the prior degassing of the active carbon and the control of the reaction by the CO partial pressure.

1. Prior degassing of the active carbon

The Applicant has demonstrated during research that all the carbon monoxide present in the scavenging gas does not come solely from the reduction and carburization reactions, but also comes from the active carbon. This active carbon, produced at a temperature below those of the reactions used in the present process, contains on the surface chemical species such as lactones, organic products of the ether type consequently having hydrogen and oxygen atoms. When these organic products are heated to the carburization temperature they decompose and give rise to releases of CO and H O, which are prejudicial to the carburization reactions.

Therefore one of the means according to the invention consists of carrying out a prior degassing of the active carbon before bringing it into contact with the volatile compound of the metal from which it is wished to obtain the carbide. This degassing takes place under an low vacuum or under scavenging of an inert gas such as argon, at a temperature and for a time such that when the active carbon is then placed at a temperature and in an inert gas flow identical to the carburization reaction, the CO partial pressure does not exceed in the case of silicon carburization 2 hPa. Thus, this partial pressure substantially corresponds to the pressure beyond which, according to table 2, the reaction (2) occurs in the sense of $SiO_2$ formation. In practice, the recommended degassing takes place at temperatures between 1000° and 1200° C. for between 0.5 and 2 hours.

2. Controlling the reaction by the CO partial pressure

In order to permit this control, the process has a control loop involving the continuous measurement or measurement at regular intervals of the CO content of the inert gas on leaving the reactor, the comparison with a reference range and a modification of the operating parameters to bring the CO content to within said range. Preferably action takes place on the inert gas flow rate, which is increased if the CO content increases. To this end, an inert gas addition is initiated if the CO content exceeds a certain fixed threshold, e.g. 2 hPa. Conversely, when the CO pressure drops below another threshold, e.g. 0.05 hPa, said additional inert gas flow rate is eliminated.

It is also possible to vary the reaction temperature, which is decreased or increased as a function of whether the CO content increases or decreases, but this is more difficult to carry out because the temperature variations have more inertia than the flow rate variations.

The process, including the control of the reactor by the CO content, is then characterized by the following stages: introducing into a continuous reactor a reactive mixture constituted on the one hand by carbon, whose specific surface is at least equal to 200 m²/g and which has previously been degassed, and on the other hand a compound, volatile under the conditions of the reaction, of the metal whereof the carbide is to be produced, in proportions close to stoichiometry; scavenging the reactor by an inert gas flow introduced from the side of the entrance of the reactive mixture and extracted from the side of the exit of the carbide obtained; passing the reactive mixture into a first area heated to a temperature between 900° and 1400° C. for a time adequate to volatilize the metal compound, reduce it by carbon and finally carburize the reduced product; passing the reactive mixture into a second area where the carbide obtained, still in the presence of the inert gas, is cooled to a temperature such that it no longer oxidizes on contact with air; extracting the carbide from the reactor; and by the fact that a continuous measurement or a measurement at regular intervals takes place of the CO content of the inert gas on leaving the reactor, said value is compared with a reference range and the operating parameters are modified in order to bring the CO content within said range by acting on the inert gas flow rate, which is increased if the CO content increases and decreased if the CO content decreases, or alternatively an action takes place on the reaction temperature.

Products obtained

The products obtained are characterized by:

their composition: they contain 0 to 30% of residual carbon and less than 1% of residual oxide or metal; their structure: the size of the carbide crystallites is between 50 and $400.10^{-10}$m; their BET surface between 10 and 200 m²/g: and their porous texture defined by filiation from that of the starting active carbon. The active carbon grain has three porosity types: a macroporosity between nodules having an average diameter of 2 to 5 μm, a mesoporosity between particles having an average diameter of 30 to 50 Angströms and a microporosity within the particles having an average diameter of 5 to 15 Angströms. The carbides and in particular silicon carbide are defined with respect to the starting carbon by the preservation of the macroporosity, the multiplication by a factor of approximately 3 of the average size of the mesopores which passes to 90 to 150 Angströms and the almost complete disappearance of the microporosity.

This filiation of the porous texture is of great interest, because it makes it possible to produce carbide having a controlled mesoporosity by the choice of an active carbon having an appropriate porous texture.

BRIEF DESCRIPTION OF THE DRAWINGS

The process according to the invention, characterized by the scavenging of the reactor by a neutral gas under atmospheric pressure, is diagrammatically represented in its preferred performance apparatus, a continuously operating rotary furnace, in FIG. 1.

The process of the invention applied to the particular case of discontinuous silicon carbide production is diagrammatically represented in FIG. 2.

DESCRIPTION OF THE PREFERRED EMBODIMENTS

Figure 1:
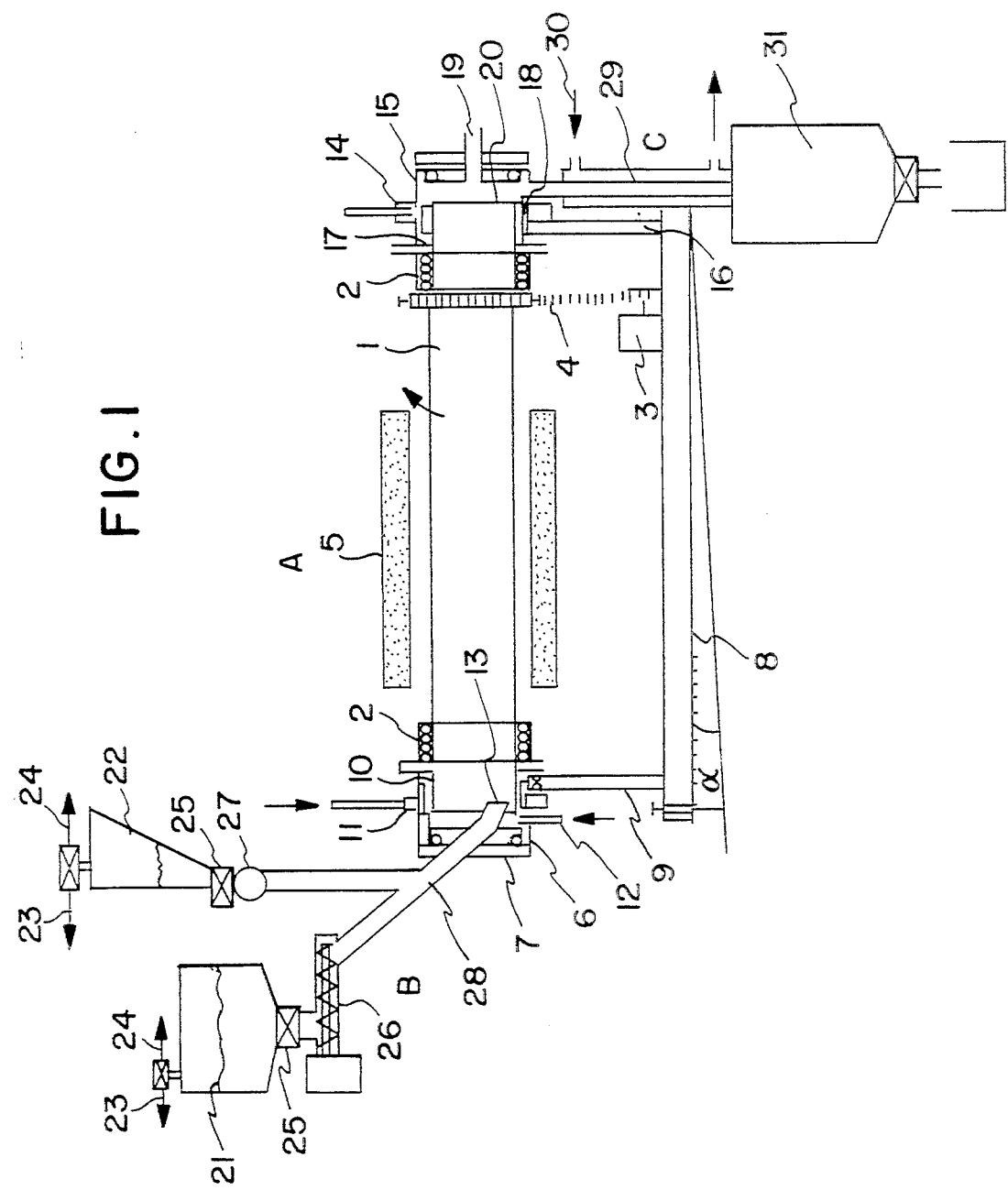

In FIG. 1, the furnace comprises three essential parts, namely the heating part or the real furnace (A) and the ancillary rotary, heating, intake and discharge devices; the upstream admission part for the starting materials (B); and the downstream extraction part for the finished products (C).

The actual furnace (A) is constituted by a refractory tube (1), which is not reducible by carbon under the operating conditions (temperature $<1400°$ C.). Alumina is preferably chosen. The tube axis is inclined to the horizontal by an angle varied by means of a not shown mechanical device. At each of its ends, the tube is supported by a bearing (2), like that shown in the drawing, or rests on rollers having axes parallel to that of the tube. A moto-variator unit (3) makes it possible, by a system of pulleys and belts or toothed wheels and chain (4) to rotate the furnace at a speed which can be varied. Heating takes place by an envelope (5) provided with electrical resistors and surrounding the central area of the tube.

The intake of the furnace (6) is constituted by a tight box (7) fixed to the frame of the furnace (8) by a support (9). The upstream furnace end rotates within said box, to which it is connected by a rotary joint (10). The box is cooled with the aid of an annular, water circulation chamber (11). It is provided with a small tube or socket (12) by which it is possible to form a vacuum or supply a scavenging gas. Finally, the starting material supply channel (28) traverses it and issues at the top of the furnace (13).

The outlet from the furnace (14) is also constituted by a tight box (15) fixed to the frame of the furnace (8) by a support (16). The downstream furnace end rotates within said box, to which it is connected by a rotary joint (17). The box is cooled with the aid of an annular water circulation chamber (18). It is equipped with a small tube or socket (19) by which the vacuum is formed or a scavenging gas is discharged. Finally, the finished product extraction channels (29) traverses it and issues at the end of the furnace (20).

The upstream starting material admission part (B) comprises a hopper (21) for the carbon supply and a hopper (22) for the metal oxide supply. Each of these tight hoppers is provided in its upper part with a three-way valve, so that it can be linked either with a vacuum pump (23), or with an inert gas source (24). At the base of each of these hoppers is provided a sealing system (25) and a distribution and dosing system. It is possible to see an endless screw (26) beneath the carbon hopper and a blade-equipped rotary distributor (27) beneath the metal oxide hopper. The two supplies join in the starting material supply channel (28).

The downstream finished product extraction part (C) comprises an extraction channel (29), cooled by a water circulation (30) and which issues into a tight hopper (31) provided in its lower part with a valve for carbide extraction. The assembly is also placed under an inert gas.

The furnace functions in the following way. It is firstly rotated and heated at the reaction temperature appropriate for the treated products, accompanied by the scavenging of an inert gas such as argon. In order to speed up the placing under an inert atmosphere, it is possible to produce beforehand a vacuum in the complete installation. When the reaction temperature is reached, the starting materials are introduced through the upstream starting material admission part (B). The dosing of the starting materials takes place by means of distributing-dosing means (26, 27). These starting materials, due to the furnace rotation and its inclination with respect to the horizontal, travel from the upper part of the furnace towards its lower part whilst being progressively reduced and carburized. The reaction must be complete at the instant when the products enter the downstream finished product extraction part (C). In the latter, the carbide formed cools under inert gas and is extracted by means of the hopper (31).

The residence time in the heated part of the furnace is regulated in the conventional way by the furnace length, its inclination angle with respect to the horizontal and its rotation speed.

The inventors have unexpectedly found that the reaction times are significantly shortened compared with the duration of the reaction in the discontinuous vacuum process, namely 2 to 4 hours in place of approximately 4 to 7 hours. This is doubtless due to the vigorous stirring or mixing of the starting materials, which ensures a good contact between the carbon and the gaseous metal compound.

Preference is given to the rotary furnace due to its double function of transporting the product and permanently mixing the starting materials of the reaction. However, the scope of the present patent is not limited to said apparatus, which is only described as an example for a continuous reaction under an atmospheric pressure. It is also possible to use other reactor types, namely passage furnaces, in which the products placed on a continuous belt or chain, or in successive containers traverse the furnace scavenged by a neutral gas flow, fluidized bed reactors, in which the fluidization gas is the neutral gas, sinking furnaces in which the products, charged into the upper part of the furnace, flow under their own weight successively traversing a first heating zone and a second cooling zone.

A particularly important case requires a special development. This is the case of carbides for which there is an oxide or an oxide doped e.g. by alkalis, particularly sodium and potassium, which sublimate sufficiently rapidly at temperatures between 800° and 1400° C. This is the case with molybdenum carbide, whose corresponding oxide $MoO_3$ is volatile. It is also the case with tungsten carbide, whose oxide forms, with soda, a salt $(WO_3)_x(NaCH)_{1-x}$, which is also volatile. Carburization takes place in two stages, which can be perfectly separated as a result of the temperature and in particular kinetic conditions. They consist firstly of the reduction of the oxide or the gaseous doped oxide into suboxide and/or metal deposited on the carbon and then the complete reduction to metal and carburization.

The first gas-solid reaction is fast, particularly in the case of molybdenum trioxide and, as only limited residence times are required, it can take place in a small rotary furnace. The intermediate product, constituted by a suboxide deposit on carbon, is perfectly stable and, without disadvantage can be stored in air. The second reaction, which takes place by solid-solid diffusion, is slow and requires a longer residence time and therefore a larger rotary furnace. Such a process will be described in exemplified manner hereinafter with respect to the performance of the invention.

Figure 2:
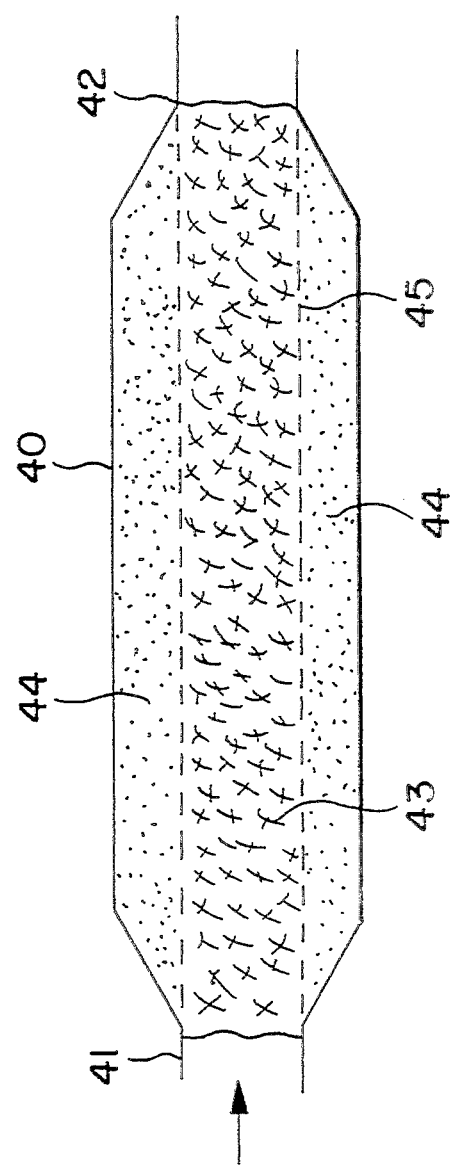

FIG. 2 shows a discontinuous reactor for silicon carbide production. FIG. 2 can be considered both as the section of a cylindrical reactor and as the plan view of a planar nacelle or boat. The reactor has an outer envelope (40) made from a refractory material which is stable under the operating conditions. The outer envelope has section reductions at the inlet (41) and the outlet (42). Its central part (43) is filled with carbon having a large specific surface, e.g. active carbon or charcoal, whilst its lateral part (44) is filled with a mixture of silica and silicon. A porous refractory partition (45) can optionally separate the two reagents, but this is not vital. An inert gas, e.g. argon, is introduced by the inlet (41) and permanently scavenges the reactor, most of it solely traversing the carbon, due to the pressure drop of the silica-silicon bed and also the porous partition, if provided. This is followed by heating to a temperature between 900° and 1400° C. At this temperature, the silicon reduces the silica giving SiO outside the presence of the carbon and in practice outside the scavenging flow. The SiO is then reduced and carburized in contact with the carbon, whilst the carbon monoxide formed is eliminated by the argon flow circulating in the carbon bed.

EXAMPLES

The first two examples described hereinafter were performed in a rotary furnace in accordance with the above description. The furnace length was 0.75 m, its inclination angle to the horizontal varying between 1° and 3° and having a rotation speed of 0.05 to 0.2 r.p.m.

EXAMPLE 1

Two-stage molybdenum carbide production

This example illustrates the production of molybdenum carbide from an easily sublimatable oxide, i.e. $MoO_3$.

Active carbon was firstly degassed in vacuo for 1 hour at a temperature of 1100° C. In a first stage, the oxide mixed with active carbon was sublimated and deposited on the active carbon, which partly reduces it to the suboxide $MoO_2$. To carry out this first stage, the furnace is regulated to 800° C., its inclination angle and rotation speed being regulated in such a way that the residence time of the products in the furnace is 1 hour. The furnace is placed under argon scavenging at a rate of 50 litres/hour. The powders of pure $MoO_3$ and active carbon mixed in stoichiometric proportions are continuously introduced into the furnace. At the outlet and after cooling, a homogeneous, perfectly stable powder is collected constituted by active carbon covered by the suboxide $MoO_2$.

In first second stage, the intermediate product formed $McO_2$ and active carbon is completely reduced and carburized. In order to carry out said second stage, the furnace is set at 1300° C., its inclination angle and rotation speed being regulated in such a way that the residence time of the product in the furnace is 2 hours. The furnace is placed under argon scavenging at a flow rate of 50 liters/hour. The intermediate product formed from $McO_2$ and active carbon is continuously introduced into the furnace. At the outlet thereof and after cooling, approximately 100 g/h of a powder is collected, which is constituted by 85% molybdenum carbide $Mo_2C$ and 15% active carbon which has not reacted. Its metallic molybdenum content is below 0.1%. This powder has a BET surface of 150 $m^2/g$ and the average crystallite size is 340 Amgströms=$340.10^{-10}$m.

EXAMPLE 2

Two-stage tungsten carbide production

This example illustrates the production of tungsten carbide from $WO_3$ doped with soda. In this case the starting product is soda-doped tungsten oxide of general formula $(WO_3)_x(NaCH)_{1-x}$. In the experiment of this example, the doped tungsten oxide contained 90% $WO_3$ and 10% NaCH by weight.

Firstly, the doped oxide mixed with active carbon degassed under the conditions of example 1 is sublimated and deposited on active carbon, which partly reduces it to $WO_2$ suboxide. For carrying out this first stage, the furnace is set at 1400° C., its inclination angle and rotation speed being regulated in such a way that the residence time of the products in the furnace is 2 hours. The furnace is placed under argon scavenging at a flow rate of 50 liters/hour. The doped $WO_3$ and active carbon powders mixed in stoichiometric proportions are continuously introduced into the furnace. At the outlet and after cooling; collection takes place of a homogeneous, perfectly stable powder constituted by active carbon covered with suboxide $WO_2$.

In the second stage, the intermediate product formal from $WO_2$ and active carbon is completely reduced and carburized. To perform said second stage, the furnace is set at 1400° C., its inclination angle and rotation speed being regulated in such a way that the residence time of the product in the furnace is 4 hours. The furnace is placed under argon scavenging at a flow rate of 50 liters/hour. The intermediate product formed from $WO_2$ and active carbon is continuously introduced into the furnace. At the outlet and after cooling, collection takes place of approximately 50 g/h of a powder formed from 78% tungsten carbide WC and 22% active carbon which has not reacted. Its metallic tungsten content is substantially zero. This powder has a BET surface of 110 $m^2/g$ and the average crystallites size is 430 Angströms.

EXAMPLE 3

Production of silicon carbide under argon scavenging

This example makes use of the apparatus shown in FIG. 2. The central part is constituted by 12 g of agglomerated active carbon powder granules, then degassed in vacuo in accordance with the conditions described in example 1 and the central part is constituted by 44 g of an intimate mixture of silica powder and silicon powder in stoichiometric quantities: 31.8% Si and 68.2% $SiO_2$. Into the central part is introduced an argon flow at a rate of 20 liters/hour. The temperature is raised to 1400° C. and maintained for 5 hours. Cooling takes place, still under argon scavenging. The product obtained is constituted by 87% silicon carbide and 13% residual carbon. The size of they crystallites is on average 240 Ångströms. This is followed by an oxidation treatment for eliminating the residual carbon. The BET surface is 38 m²/g before said treatment and 20 m²/g after it.

What is claimed is:

1. Process for the continuous production of a metal carbide having a BET specific surface area of 10 to 200 m²/g, comprising the steps of:
   a) introducing into an entrance portion of a continuous reactor, a reactive mixture comprising carbon having specific surface area of at least 200 m²/g, and a compound of a metal to be reacted with the carbon, said compound being volatile at a temperature of 900° C. to 1400° C., proportions of the mixture being about stoichiometric for reducing the metal compound with carbon and carburizing the metal obtained by said reduction;
   b) scavenging the reactor by introducing a flow of inert gas into the entrance portion of said reactor, and removing the flow of inert gas from an exit portion of the reactor;
   c) moving the reactive mixture toward the exit portion of the reactor and into a first zone heated to a temperature 900° C. to 1400° C., said reactive mixture remaining in said first zone for a time sufficient to volatilize the metal compound, reduce the volatilized metal compound to the metal by reaction with the carbon, and carburize the metal by reaction with the carbon, forming the metal carbide;
   d) moving the metal carbide formed into a second reactor zone and cooling the metal carbide therein under the inert gas flow to a temperature sufficient that the carbide is not oxidized in contact with air; and
   e) moving the cooled carbide to said exit portion and removing the cooled carbide from the reactor.

2. Process according to claim 1, additionally comprising the steps of measuring continuously or at regular intervals the CO content of the inert gas at the exit portion of the reactor, comparing said content with a reference range and modifying operating parameters to maintain said range by acting on the inert gas flow rate, increasing or decreasing said flow rate if the CO content increases or decreases, respectively, or decreasing the reaction temperature if the CO content increases.

3. Process for the production of a metal carbide having a BET specific surface area of 10 to 200 m²/g, comprising the steps of:
   a) introducing into a reactor a reaction mixture comprising carbon having specific surface area of at least 200 m²/g, and a compound of a metal to be reacted with the carbon, said compound being volatile at 900° C. to 1400° C., proportions of the mixture being about stoichiometric for reducing the metal compound by carbon and carburizing the metal obtained by said reducing;
   b) scavenging the reactor by introducing a flow of inert gas into the reactor;
   c) heating the reactive mixture under the flow of inert gas to a temperature of 900° C. to 1400° C. for a time sufficient to volatilize the metal compound, reduce the volatilized metal compound to the metal by reaction with the carbon, and carburize the metal by reaction with the carbon, forming the metal carbide;
   d) cooling the metal carbide under the flow of inert gas to a temperature sufficient that the metal carbide is not oxidized in contact with air; and
   e) removing the cooled metal carbide from the reactor.

4. Process according to one of the claims 3, 1 or 2, wherein the carbon is active carbon or charcoal.

5. Process according to claim 4, wherein the active carbon is a degassed carbon, treated by steps comprising degassing under vacuum or by scavenging by an inert gas at a temperature between 1000° and 1200° C. for between 0.5 and 2 hours.

6. Process according to claim 4, wherein the active carbon is carbon doped with Ce, U, Ti, Zr or Hf salts or lanthanides.

7. Process according to one of the claims 3, 1 or 2, wherein the carbon comprises agglomerated carbon powder.

8. Process according to one of the claims 3, 1, or 2, wherein the metal is selected from the group consisting of silicon transition metals (groups 3b, 4b, 5b, 6b, 7b, 8 of series 4, 5, 6 of the classification of elements), metals of rare earths and actinides.

9. Process according to claim 8, wherein the metal is selected from the group consisting of Mo, W. Re, V, Nb, Ta, Ti, Dr, and Ni.

10. Process according to one of the claims 3, 1 or 2, wherein the metal compound is an oxide.

11. Process according to one of the claims 3,1 or 2, wherein the reactive mixture comprises an agglomerated mixture of carbon powder and the metal compound.

12. Process according to one of the claims 1 or 2, additionally comprising rotating said reactor on an axis slightly inclined with respect to the horizontal.

13. Process according to claim 1 or 2, wherein the reaction mixture is moved through the reactor substantially horizontally.

14. Process according to claim 1 or 2, additionally comprising fluidizing the reaction mixture in the reactor.

15. Process according to claim 1 or 2, wherein the reaction mixture moves substantially vertically under its own weight in the reactor.

16. Process according to claim 1 or 2, wherein the compound metal is an oxide or doped oxide of the metal which rapidly sublimates at 800° C. to 1400° C., additionally comprising the steps of:
   a) introducing into a first rotary furnace scavenged by an inert gas flow, a reactive mixture comprising carbon having a specific surface area of at least 200 m²/g and said oxide or doped oxide;
   b) passing the reactive mixture into a zone of said first reactor heated to 800° C. to 1400° C. for a time sufficient to volatilize the oxide or doped oxide, partially reducing the oxide to a suboxide which is deposited on the carbon to form an intermediate product;
   c) cooling the intermediate product and removing said product from said first reactor;
   d) passing the product removed into a second rotary furnace constituting said continuous reactor scavenged with inert gas and into a zone heated to 900° C. to 1400° C. for a time sufficient to completely reduce the suboxide to metal and carburize the metal, to form the metal carbide; and
   e) cooling the metal carbide to a temperature sufficient that the carbide does not oxidize in air, and removing the cooled carbide from the reactor.

17. Process according to claim 16, wherein the oxide which rapidly sublimates between 800° and 1400° C. is molybdenum trioxide McO$_3$.

18. Process according to claim 16, wherein the doped oxide is tungsten oxide doped by soda or potash, of formula $(WO_3)_x(NaOH)_{1-x}$ or $(WO_3)_x(KOH)_{1-x}$.

19. Process according to claim 3, additionally comprising the steps of:
a) providing a reactor having an outer envelope with a large central portion and inlet and outlet portions of reduced cross-section;
b) distributing said reactive mixture in said central portion such that a center portion contains said carbon, surrounded concentrically by a mixture of silicon carbide and silicon;
c) introducing said flow of inert gas such that the gas substantially scavenges said carbon; and
d) heating the reactor to 900° C. to 1400° C. so as to cause the silicon and silica to react to form gaseous SiO, reducing and carburizing the SiO on contact with said carbon, with the formation of carbon monoxide gas, and eliminating the carbon monoxide gas by said flow of inert gas.

20. Process according to claim 3 or 1, wherein said scavenging is under atmospheric pressure.

* * * * *